United States Patent
Brownell et al.

(10) Patent No.: US 9,932,431 B2
(45) Date of Patent: Apr. 3, 2018

(54) DISPERSION OF ADSORBING EMULSION POLYMER PARTICLES

(71) Applicant: Rohm and Haas Company, Philadelphia, PA (US)

(72) Inventors: Arnold S. Brownell, Lansdale, PA (US); Yogesh Tiwary, Bangalore (IN)

(73) Assignee: Rohm and Haas Company, Collegeville, PA (US)

( * ) Notice: Subject to any disclaimer, the term of this patent is extended or adjusted under 35 U.S.C. 154(b) by 416 days.

(21) Appl. No.: 14/732,838

(22) Filed: Jun. 8, 2015

(65) Prior Publication Data

US 2015/0361291 A1     Dec. 17, 2015

Related U.S. Application Data

(60) Provisional application No. 62/011,122, filed on Jun. 12, 2014.

(51) Int. Cl.
| | | |
|---|---|---|
| *C09D 133/08* | (2006.01) | |
| *C08F 220/18* | (2006.01) | |
| *C08F 220/10* | (2006.01) | |
| *C08L 33/06* | (2006.01) | |

(52) U.S. Cl.
CPC .......... *C08F 220/18* (2013.01); *C09D 133/08* (2013.01); *C08F 220/10* (2013.01); *C08L 33/06* (2013.01)

(58) Field of Classification Search
CPC ............................. C09D 133/08; C08F 220/18
See application file for complete search history.

(56) References Cited

U.S. PATENT DOCUMENTS

| | | |
|---|---|---|
| 2014/0329957 A1 | 11/2014 | Bohling et al. |
| 2015/0005446 A1 | 1/2015 | Bohling et al. |

FOREIGN PATENT DOCUMENTS

| | | | |
|---|---|---|---|
| EP | 2567990 A1 | | 3/2013 |
| EP | 2845870 A1 | | 3/2015 |
| WO | WO2013096162 A1 | * | 6/2013 |
| WO | 2013116318 A1 | | 8/2013 |
| WO | WO2013116318 A1 | * | 8/2013 |
| WO | 2014/088873 A1 | | 6/2014 |

* cited by examiner

*Primary Examiner* — Peter D. Mulcahy
(74) *Attorney, Agent, or Firm* — Reid S. Willis

(57) ABSTRACT

The present invention is a composition comprising a stable aqueous dispersion of polymer particles having a core comprising structural units of: a) a phosphorus acid monomer, b) an acid monomer, c) a multiethylenically unsaturated monomer; and d) a polymerizable ethylenically unsaturated bulk monomer; and a shell comprising structural units of a1) a sulfur acid monomer, and b1) a polymerizable ethylenically unsaturated bulk monomer; wherein the core protuberates from the shell and the ratio of the structural units of the sulfur acid monomer to structural units of carboxylic acid monomer in shell is at least 0.2:1. Control of the proportion of sulfur acid monomer units to carboxylic acid monomer units results in an improvement in the viscosity stability of paint formulations containing latexes possessing acorn morphology without sacrificing hiding.

8 Claims, No Drawings

DISPERSION OF ADSORBING EMULSION POLYMER PARTICLES

BACKGROUND OF THE INVENTION

The present invention relates to a latex composition with improved viscosity stability in paint.

Viscosity drift, more particularly Krebs Unit viscosity drift (KU drift) in paint formulations is undesirable because formulators and final users want to achieve a target viscosity with assurance of stability of that viscosity. Some paint formulations that contain latex polymers that adsorb to the surfaces of pigment particles to form composites are especially prone to KU drift, especially where the rate of adsorption of the adsorbing latex (also known as the pre-composite) and the pigment particles, typically $TiO_2$ particles, is slow. This slow adsorption is attributed to the presence of adsorbing inefficiencies arising from the surface treatment of the $TiO_2$ particles, which slows down the rate of adsorption between the latex particles and the $TiO_2$ particles; additionally, surface active agents used to prepare $TiO_2$ slurries may also adversely affect the rate at which the adsorbing latex particles adsorb to the $TiO_2$ particles. Moreover, associative thickeners such as hydrophobically modified ethylene oxide urethane polymers (HEURs) and hydrophobically modified alkali swellable or soluble emulsions (HASEs), which form a network with the latex particles, are believed to interfere with the ability of these particles to adsorb to the surface of the $TiO_2$ particles.

Therefore, it would be an advance in the art of pigment-adsorbing latex technology to find a way to eliminate or substantially reduce viscosity drift in paint formulations.

SUMMARY OF THE INVENTION

The present invention addresses a problem known in the art of composite forming latexes by providing a stable aqueous dispersion of polymer particles having a shell and a core protuberating from the shell, wherein the protuberating core comprises, based on the weight of the core: a) from 2 to 15 weight percent structural units of a phosphorous acid monomer or a salt thereof; b) from 0.2 to 20 weight percent structural units of a carboxylic acid monomer or a sulfur acid monomer or a salt thereof or a combination thereof; c) from 0.1 to 30 weight percent structural units of a multiethylenically unsaturated monomer; and d) from 50 to 95 weight percent structural units of a polymerizable ethylenically unsaturated bulk monomer; wherein the shell comprises, based on the weight of the shell: a1) less than 1 weight percent structural units of a phosphorus acid monomer or salt thereof; b1) from 0.1 to 4 weight percent structural units of a sulfur acid monomer or a salt thereof, based on the weight of the shell; c1) less than 2 weight percent structural units of a carboxylic acid monomer or salt thereof; and d1) from 80 to 99 weight percent structural units of a polymerizable ethylenically unsaturated bulk monomer; wherein the ratio of structural units of the sulfur acid monomer to structural units of carboxylic acid monomer is at least 0.2:1 and wherein the weight-to-weight ratio of the shell to the core is in the range of from 3:1 to 50:1.

The composition of the present invention addresses a need by providing improved KU stability for coatings formulations containing composites that use acorn morphology.

DETAILED DESCRIPTION OF THE INVENTION

The present invention is a composition comprising a stable aqueous dispersion of polymer particles having a shell and a core protuberating from the shell, wherein the protuberating core comprises, based on the weight of the core: a) from 2 to 15 weight percent structural units of a phosphorous acid monomer or a salt thereof; b) from 0.2 to 20 weight percent structural units of a carboxylic acid monomer or a sulfur acid monomer or a salt thereof or a combination thereof; c) from 0.1 to 30 weight percent structural units of a multiethylenically unsaturated monomer; and d) from 50 to 95 weight percent structural units of a polymerizable ethylenically unsaturated bulk monomer; wherein the shell comprises, based on the weight of the shell: a1) less than 1 weight percent structural units of a phosphorus acid monomer or salt thereof; b1) from 0.1 to 4 weight percent structural units of a sulfur acid monomer or a salt thereof, based on the weight of the shell; c1) less than 2 weight percent structural units of a carboxylic acid monomer or salt thereof; and d1) from 80 to 99 weight percent structural units of a polymerizable ethylenically unsaturated bulk monomer; wherein the ratio of structural units of the sulfur acid monomer to structural units of carboxylic acid monomer is at least 0.2:1 and wherein the weight-to-weight ratio of the shell to the core is in the range of from 3:1 to 50:1.

As used herein, the term "structural unit" of the named monomer, refers to the remnant of the monomer after polymerization. For example, a structural unit of methyl methacrylate is as illustrated:

structural unit of methyl methacrylate
where the dotted lines represent the points of attachment of the structural unit to the polymer backbone.

The polymer particles in the stable aqueous dispersion are characterized by a core-shell morphology (also referred to as acorn morphology) wherein the core protuberates from the shell, as illustrated below:

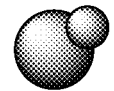

The protuberating core preferably comprises from 5 to 10 weight percent structural units of a phosphorus acid monomer or a salt thereof. Examples of suitable phosphorus acid monomers include phosphonates and dihydrogen phosphate esters of an alcohol in which the alcohol contains or is substituted with a polymerizable vinyl or olefinic group. Preferred dihydrogen phosphate esters are phosphates of hydroxyalkyl(meth)acrylates, including phosphoethyl methacrylate and phosphopropyl methacrylates, with phosphoethyl methacrylate being especially preferred. "Phosphoethyl methacrylate" (PEM) is used herein to refer to the following structure:

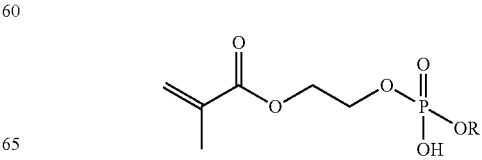

where R is H or

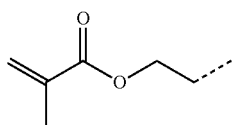

wherein the dotted line represents the point of attachment to the oxygen atom.

The core preferably comprises from 0.5, more preferably from 1, to preferably 4, and more preferably to 3 weight percent structural units of a carboxylic acid monomer or a sulfur acid monomer or a salt thereof or a combination thereof. Suitable carboxylic acid monomers include acrylic acid, methacrylic acid, itaconic acid, and salts thereof; suitable sulfur acids include sulfoethyl methacrylate, sulfopropyl methacrylate, styrene sulfonic acid, vinyl sulfonic acid, and 2-(meth)acrylamido-2-methyl propanesulfonic acid, and salts thereof. Preferably, only a carboxylic acid monomer is used to prepare the core, more preferably acrylic acid or methacrylic acid. A preferred concentration of structural units of acrylic acid or methacrylic acid is from 0.1, more preferably from 0.5, to 3 weight percent, based on the weight of the core.

The core preferably comprises from 0.3, more preferably from 0.5 weight percent to preferably 5, more preferably to 3 weight percent structural units of a multiethylenically unsaturated monomer. An example of a preferred multiethylenically unsaturated monomer is a diethylenically unsaturated monomer such as allyl methacrylate.

As used herein, a polymerizable ethylenically unsaturated bulk monomer refers to a styrene monomer or an acrylate monomer or a combination thereof. The total concentration of the polymerizable ethylenically unsaturated bulk monomer in the core is from 50 to 95 weight percent, based on the weight of the core. The structural units of polymerizable ethylenically unsaturated bulk monomer in the core are preferably a combination of the following monomers: i) methyl methacrylate, ethyl methacrylate, or styrene or a combination thereof; and ii) ethyl acrylate, butyl acrylate, or 2-ethylhexyl acrylate or a combination thereof. A more preferred combination of bulk monomers is methyl methacrylate or styrene or a combination thereof with ethyl acrylate, butyl acrylate, or 2-ethylhexyl acrylate or a combination thereof, with methyl methacrylate and butyl acrylate being especially preferred.

The core preferably contains structural units of methyl methacrylate or styrene or a combination thereof at a concentration of from 5 weight percent, more preferably from 20 weight percent, to 60 weight percent, more preferably to 40 weight percent, based on the weight of the core; and preferably contains structural units of butyl acrylate, preferably at a concentration of from 35 weight percent, more preferably from 50 weight percent, to 90 weight percent, more preferably to 70 weight percent, based on the weight of the core.

The core preferably has a volume average diameter in the range of from 30, more preferably from 40 nm, to 90, more preferably to 80 nm (as measured by a BI-90 Dynamic Light Scattering Particle Analyzer) and preferably a $T_g$ in the range of from -30° C., more preferably from -20° C., to preferably 60° C., more preferably to 40° C., and most preferably to 20° C.

The shell preferably comprises less than 0.1, more preferably less than 0.01 weight percent structural units of a phosphorus acid monomer, based on the weight of the shell, and preferably less than 0.1, more preferably less than 0.01 weight percent structural units of a multiethylenically unsaturated monomer, based on the weight of the shell. The shell most preferably includes no structural units of a phosphorus acid monomer or a multiethylenically unsaturated monomer.

The polymerizable ethylenically unsaturated bulk monomer used to form the shell preferably comprises i) methyl methacrylate or styrene or a combination thereof; and ii) ethyl acrylate, butyl acrylate, or ethylhexyl acrylate, or a combination thereof.

A preferred combination of structural units of polymerizable ethylenically unsaturated bulk monomers in the shell include 1) methyl methacrylate or styrene or a combination thereof at a concentration preferably in the range of from 35 weight percent to 75 weight percent, more preferably to 55 weight percent, based on the weight of the shell; and 2) structural units of butyl acrylate or ethyl acrylate or a combination thereof, more preferably structural units of butyl acrylate, preferably at a concentration in the range of from 25 weight percent, more preferably from 45 weight percent to preferably 70 weight percent, more preferably to 65 weight percent, based on the weight of the shell.

Preferably, the shell comprises from 0.3 to 1.5 weight percent structural units of a sulfur acid monomer. A preferred sulfur acid monomer is a sodium styrene sulfonate such as sodium 4-vinylbenzenesulfonate, or 2-acrylamido-2-methyl propanesulfonic acid (AMPS), or salts thereof or combinations thereof.

Preferably, the shell comprises less than 1.5 weight percent structural units of a carboxylic acid monomer such as acrylic acid or methacrylic acid, more preferably from 0.1 to 1.5 weight percent structural units of acrylic acid; preferably, the ratio of structural units of the sulfur acid monomer to structural units of carboxylic acid monomer is at least 0.5:1, more preferably at least 1:1, and most preferably at least 5:1. In one embodiment, the shell contains no structural units of carboxylic acid monomer.

Preferably, the weight-to-weight ratio of the shell to the core is in the range of from 5:1 to 35:1.

In a preferred method of making the stable aqueous dispersion of polymer particles, a first monomer emulsion can be prepared by contacting water, butyl acrylate, methyl methacrylate, allyl methacrylate, phosphoethyl methacrylate, and methacrylic acid under emulsion polymerization conditions to form a precursor to the protuberating core. Then, water, the precursor, and a monomer emulsion of butyl acrylate, methyl methacrylate, sodium styrene sulfonate (more particularly sodium 4-vinylbenzenesulfonate), and optionally acrylic acid under emulsion polymerization conditions to form the stable aqueous dispersion of polymer particles with acorn morphology (also referred to as acorn pre-composite polymer).

The pre-composite polymer can then be mixed with pigment particles such as $TiO_2$ particles in any order and optionally in the presence of other paint ingredients to cause the onset of composite formation. This mixture can then be used to formulate paints with the addition of one or more ingredients selected from the group consisting of dispersants, defoamers, surfactants, solvents, additional binders, thickeners, extenders, coalescents, biocides, and colorants. It has been surprisingly discovered that using a sulfonic acid as a stabilizing acid and minimizing carboxylic acid in the shell of the pre-composite polymer results in a marked improvement in viscosity stability of the paint formulation.

EXAMPLES

All of the binders used as examples use the same core, and the only variance is the amount and type of acid used in the second stage processing to make the shell. ACRYSOL is a Trademark of The Dow Chemical Company or its Affiliates.

A. Core (Pre-form) Synthesis

A first monomer emulsion was prepared by mixing deionized water (200 g), Disponil FES 993 surfactant (43 g, 30% active), butyl acrylate (371.2 g), methyl methacrylate (195.2 g), allyl methacrylate (9.6 g), phosphoethyl methacrylate (51.2 g, 60% active), and methacrylic acid (12.8 g).

To a 5-L, four necked round bottom flask equipped with a paddle stirrer, a thermometer, nitrogen inlet, and a reflux condenser was added deionized water (600 g) and Disponil FES 32 surfactant (43 g, 30% active). The contents of the flask were heated to 85° C. under $N_2$ and stirring was initiated. A portion of the first monomer emulsion (70 g) was then added, quickly followed by a solution of sodium persulfate (2.56 g) dissolved in deionized water (30 g) followed by a rinse of deionized water (5 g). After stirring for 10 min, the remainder of the first monomer emulsion, followed by a rinse (25 g), and an initiator solution of sodium persulfate (0.64 g) dissolved in deionized water (50 g) were added linearly and separately over 40 min. After the monomer emulsion feed was complete, the contents of the flask were held at 85° C. for 10 min, after which time the co-feed was complete; and the contents of the flask were then held at 85° C. for an additional 10 min. The contents of the flask were cooled to room temperature and neutralized to pH 3 with a dilute solution of ammonium hydroxide. The measured particle size was 60-75 nm and the solids were 40-41%.

B. Acorn Core-Shell Synthesis

A second monomer emulsion was prepared using deionized water (400 g), sodium dodecylbenzene sulfonate (66.5 g, 23% active), Disponil FES 993 surfactant (51g, 30% active), butyl acrylate (810.9 g), methyl methacrylate (679.9 g), varying amounts of acrylic acid (as specified in Table 2, and varying amounts sodium 4-vinylbenzenesulfonate or AMPS (as specified in Table 2). To a 5-L, four necked round bottom flask equipped with a paddle stirrer, a thermometer, $N_2$ inlet, and a reflux condenser was added deionized water (950 g). The contents of the flask were heated to 84° C. under $N_2$ and stirring was initiated. An aqueous solution sodium persulfate (5.1 g in 20 g deionized water), followed by a rinse of deionized water (5 g) was added to the kettle. The pre-form from Step A was then added, followed by addition of the second monomer emulsion and then a solution containing sodium persulfate (1.7 g) and sodium hydroxide (2 g) dissolved in deionized water (58 g), each added separately to the flask over a total period of 80 min. The contents of the flask were maintained at a temperature of 84° C. during the addition of the second monomer emulsion. When all additions were complete, the flask containing the second monomer emulsion was rinsed with deionized water (25 g), which was then added to the flask.

The contents of the flask were cooled to 65° C. and a catalyst / activator pair was added to the flask to reduce residual monomer. TERGITOL™ 15-S-40 surfactant (12.15 g, 70% solids) was added. The polymer was then neutralized to pH 8.5 with a dilute ammonium hydroxide solution. The measured particle size was 130-150 nm using a BI-90 Dynamic Light Scattering Particle Size Analyzer and the solids were typically 45-47%.

Paint Formulations

Formulation A, shown in Table 1, was used to test viscosity stability, hiding, and gloss of paints prepared using Acorn Pre-Composite Polymers. Pre-Composite polymer is the sole binder in this formulation to amplify the differences in performance, but a formulator could use optional non-adsorbing binders blended in different ratios. The pH of the paints was maintained at approximately 9.0, and approximately same amount of time (45 min) was used to make the paint from start to final mixing.

TABLE 1

Paint Formulation Using Pre-Composite Polymers

|  | Formulation A Weight (%) |
|---|---|
| Acorn Pre-Composite Polymer | 56.46 |
| Ammonia (28%) | 0.08 |
| Water | 9.75 |
| DuPont Ti-Pure R-746 TiO$_2$ | 26.82 |
| (5 min mix) |  |
| BYK-348 surfactant | 0.31 |
| Foamstar A-34 defoamer | 0.13 |
| Texanol coalescent | 1.06 |
| Water | 3.07 |
| ACRYSOL ™ RM-2020 NPR Rheology Modifier | 1.95 |
| ACRYSOL ™ RM-8W Rheology Modifier | 0.35 |
| (15 min mix) |  |
| Total Weight | 100.0 |

Kubelka-Munk S/mil Test Method

Four draw-downs were prepared on Black Release Charts (Leneta Form RC-BC) for each paint using a 1.5-mil Bird draw down bar and the charts allowed to dry overnight. Using a template, 3.25"×4" rectangles were cut out on each chart. The Y-reflectance was measured using a X-Rite Color i7 Spectrophotometer in each of the scribed areas five times and the average Y-reflectance recorded. A thick film draw down was prepared for each paint on the Black Release Charts using a 3" 25 mil block draw down bar and the charts were allowed to dry overnight. The Y-reflectance was measured in five different areas of the draw down and the average Y-reflectance recorded. Kubelka-Munk hiding value S is given by Equation 1:

$$S = \frac{R}{X \times (1 - R^2)} \times \ln\frac{1 - (R_B \times R)}{1 - \frac{R_B}{R}} \qquad \text{Equation 1}$$

where X is the average film thickness, R is the average reflectance of the thick film and $R_B$ is the average reflectance over black of the thin film. X can be calculated from the weight of the paint film ($W_{pf}$), the density (D) of the dry film; and the film area (A). Film area for a 3.25"×4" template was 13 in$^2$.

$$X(\text{mils}) = \frac{W_{pf}(g) \times 1000(\text{mil/in})}{D(\text{lbs/gal}) \times 1.964(g/\text{in}^3/\text{lbs/gal}) \times A(\text{in})}$$

The 1-day KU rise and Hiding (S/mil) for the paint samples are summarized in Table 2. After 1-day of viscosity rise (AKU), all the paint samples showed significantly smaller and similar viscosity changes typical for conventional paint.

TABLE 2

1-day KU Increase and Hiding Data for Paint Formulations.

|  | % AA | % SSS | % AMPS | Sulfonic Acid/AA | ΔKU | S/mil |
|---|---|---|---|---|---|---|
| Comp. 1 | 2 | 0.3 |  | 0.15 | 33 | 6.4 |
| Comp. 2 | 1.5 |  |  | 0.00 | 30 | 6.4 |
| Ex. 1 | 1.2 | 0.3 |  | 0.25 | 23 | 6.4 |
| Ex. 2 | 1.2 | 0.6 |  | 0.50 | 23 | 6.4 |
| Ex. 3 | 1.2 | 1.2 |  | 1.00 | 17 | 6.4 |
| Ex. 4 |  | 1.5 |  | Infinity | 19 | 6.4 |
| Ex. 5 |  |  | 1.5 | Infinity | 16 | 6.4 |
| Ex. 6 | 0.3 | 0.6 |  | 2.00 | 17 | 6.2 |
| Ex. 7 | 0.6 | 0.6 |  | 1.00 | 22 | 6.3 |
| Ex. 8 | 0.9 | 0.6 |  | 0.67 | 20 | 6.4 |

The data shows that all paints made using Acorn Pre-Composite Polymers with sodium styrene sulfonate or AMPS in combination with reduced or zero levels of acrylic acid have significantly improved viscosity stability, with negligible impact on hiding. Moreover, increasing levels of SSS, as opposed to increasing levels of AA, shows no adverse effect on viscosity stability.

Pre-Composite polymers with relatively high ratios of structural units of sulfonic acid to structural units of acrylic acid (≥0.2), with a relatively low total concentrations of carboxylic acid functionality, present a cost effective way of improving KU stability without sacrificing hiding. Furthermore, the ability to achieve these desired properties with reduced overall acid usage provides additional performance benefits, such as improved water sensitivity and scrub resistance.

The invention claimed is:

1. A composition comprising a stable aqueous dispersion of polymer particles having a shell and a core protuberating from the shell, wherein the protuberating core comprises, based on the weight of the core:
   a) from 2 to 15 weight percent structural units of a phosphorous acid monomer or a salt thereof;
   b) from 0.2 to 20 weight percent structural units of a carboxylic acid monomer or a sulfur acid monomer or a salt thereof or a combination thereof;
   c) from 0.1 to 30 weight percent structural units of a multiethylenically unsaturated monomer; and
   d) from 50 to 95 weight percent structural units of a polymerizable ethylenically unsaturated bulk monomer;

wherein the shell comprises, based on the weight of the shell:
   a1) less than 1 weight percent structural units of a phosphorus acid monomer or salt thereof;
   b1) from 0.1 to 4 weight percent structural units of a sulfur acid monomer or a salt thereof, based on the weight of the shell;
   c1) less than 2 weight percent structural units of a carboxylic acid monomer or salt thereof; and
   d1) from 80 to 99 weight percent structural units of a polymerizable ethylenically unsaturated bulk monomer;

wherein the ratio of structural units of the sulfur acid monomer to structural units of carboxylic acid monomer is at least 0.2:1 and wherein the weight-to-weight ratio of the shell to the core is in the range of from 3:1 to 50:1.

2. The composition of claim 1 wherein the protuberating core comprises, based on the weight of the core:
   a) from 5 to 10 weight percent structural units of a phosphorus acid monomer or a salt thereof;
   b) from 0.5 to 4 weight percent structural units of a carboxylic acid monomer or a salt thereof;
   c) from 0.5 to 5 weight percent structural units of a multiethylenically unsaturated monomer; and
   d) from 50 to 95 weight percent structural units of the polymerizable ethylenically unsaturated bulk monomer; and wherein the shell comprises based on the weight of the shell:
   a1) less than 0.1 weight percent structural units of a phosphorus acid monomer;
   b1) from 0.3 to 1.5 weight percent structural units of a sulfur acid monomer; and
   c1) less than 1.5 weight percent structural units of a carboxylic acid monomer or salt thereof;

wherein the ratio of structural units of the sulfur acid monomer to structural units of carboxylic acid monomer is at least 0.5:1.

3. The composition of claim 1 wherein the structural units of the polymerizable ethylenically unsaturated bulk monomer of the core and the shell are structural units of i) methyl methacrylate, ethyl methacrylate, or styrene or a combination thereof; and ii) ethyl acrylate, butyl acrylate, or 2-ethylhexyl acrylate or a combination thereof.

4. The composition of claim 3 wherein the structural units of the polymerizable ethylenically unsaturated bulk monomer in the core comprise from 20 to 60 weight percent structural units of methyl methacrylate or styrene or a combination thereof, and from 35 to 70 weight percent structural units of butyl acrylate, based on the weight of the structural units of the polymerizable ethylenically unsaturated bulk monomer in the core; and wherein the polymerizable ethylenically unsaturated bulk monomer in the shell comprises from 35 weight percent to 75 weight percent methyl methacrylate or styrene or a combination thereof, and from 45 to 65 weight percent structural units of butyl acrylate, based on weight of structural units of the polymerizable ethylenically unsaturated bulk monomer in the shell.

5. The composition of claim 4 wherein the core comprises from 0.1 to 3 weight percent structural units of the carboxylic acid, based on the weight of the core, wherein the carboxylic acid monomer is acrylic acid or methacrylic acid; and wherein the phosphorus acid monomer is phosphoethyl methacrylate.

6. A composition comprising a stable aqueous dispersion of polymer particles having a shell and a core protuberating from the shell, wherein the protuberating core comprises, based on the weight of the core:
   a) from 5 to 10 weight percent structural units of phosphoethyl methacrylate or a salt thereof;
   b) from 0.1 to 3 weight percent structural units of acrylic acid or a salt thereof;
   c) from 0.3 to 3 weight percent structural units of allyl methacrylate; and
   d) from 20 to 60 weight percent structural units of styrene or methyl methacrylate or a combination thereof;
   e) from 50 to 70 weight percent structural units of butyl acrylate;

wherein the shell comprises, based on the weight of the shell:
   a1) less than 0.1 weight percent structural units of a phosphorus acid monomer or salt thereof;

b1) from 0.3 to 1.5 weight percent structural units of sodium 4-vinylbenzenesulfonate;
c1) less than 0.1 weight percent structural units of a multiethylenically unsaturated monomer;
d1) less than 1.5 weight percent structural units of a carboxylic acid monomer or salt thereof; and
e1) from 35 to 55 weight percent structural units of styrene or methyl methacrylate or a combination thereof;
f1) from 45 to 65 weight percent structural units of butyl acrylate;

wherein the ratio of structural units of the sodium 4-vinylbenzenesulfonate to structural units of the carboxylic acid monomer is at least 5:1 and wherein the weight-to-weight ratio of the shell to the core is in the range of from 5:1 to 35:1.

7. The composition of claim 6 wherein the shell comprises from 0.1 to 1.5 weight percent structural units of acrylic acid.

8. The composition of claim 6 wherein the shell comprises no structural units of carboxylic acid monomer.

* * * * *